Feb. 24, 1931.  R. T. KNAPP  1,793,701
APPARATUS FOR THE CONTINUOUS WEIGHING OF MATERIAL
Filed June 11, 1928  2 Sheets-Sheet 1
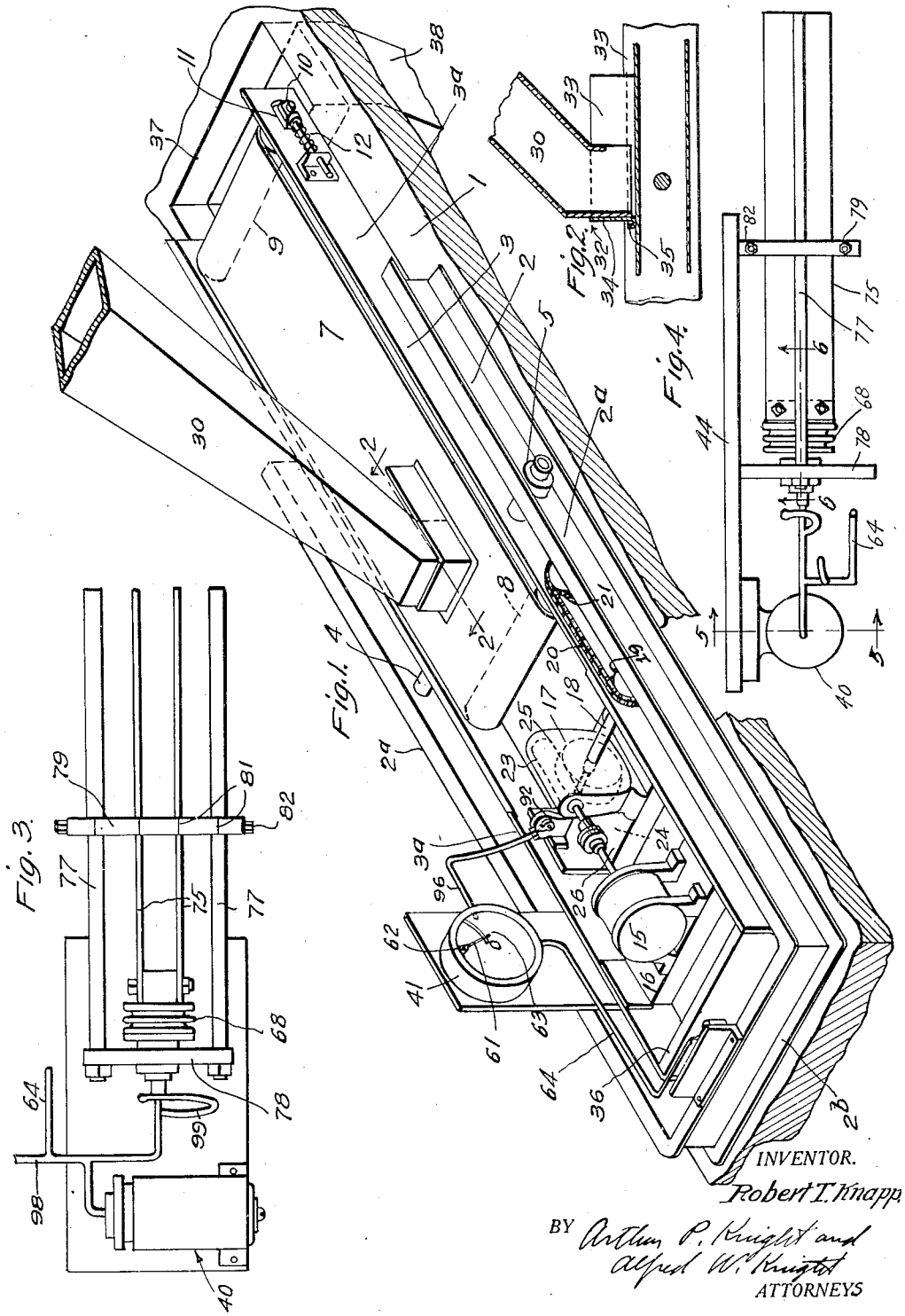
INVENTOR.
Robert T. Knapp
BY Arthur P. Knight and
Alfred W. Knight
ATTORNEYS

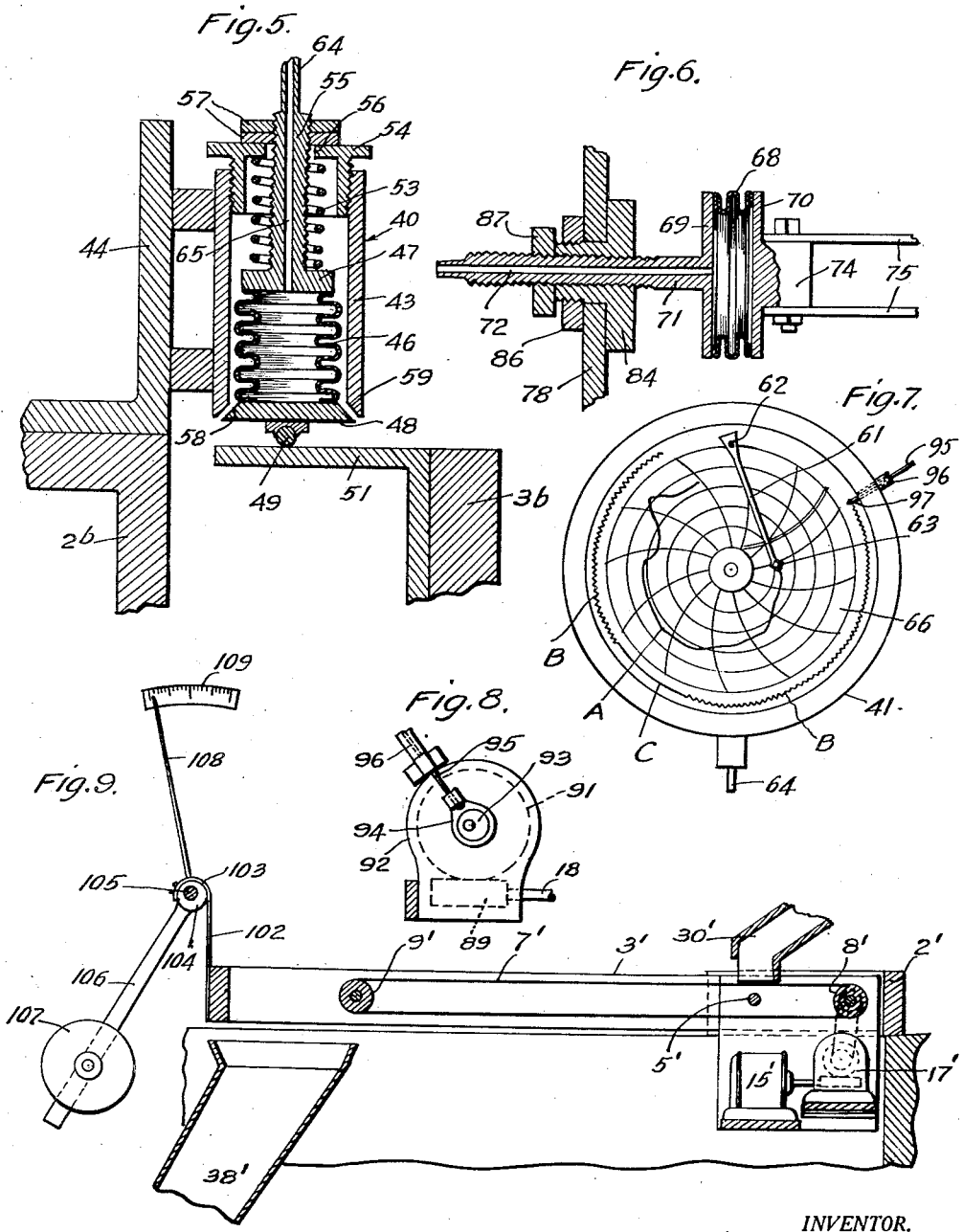

Patented Feb. 24, 1931

1,793,701

UNITED STATES PATENT OFFICE

ROBERT T. KNAPP, OF PASADENA, CALIFORNIA, ASSIGNOR TO RIVERSIDE CEMENT COMPANY, OF LOS ANGELES, CALIFORNIA, A CORPORATION OF DELAWARE

APPARATUS FOR THE CONTINUOUS WEIGHING OF MATERIAL

Application filed June 11, 1928. Serial No. 284,316.

This invention relates to the continuous weighing of material, for example material being fed to or delivered from apparatus of any kind or being conveyed from one point to another. The invention is directed particularly to a weighing apparatus which is adapted to automatically measure (either record or indicate) the weight of the material. The apparatus of this invention is adapted, for example, to continuously measure and record the weight of raw material fed into cement kilns, but is of course not limited to such use and may be used in connection with many other materials, particularly solid materials in a crushed or ground, or more or less finely divided condition.

The main object of the invention is to provide an apparatus for the above purpose which is extremely accurate and reliable in operation, and at the same time is of rugged construction, and which gives a clear record or indication of the weight of the material.

A particular object of the invention is to provide an apparatus in which the balance means upon which the material is actually weighed, and all moving parts connected therewith, are mounted to swing together about a common horizontal axis of support and are in themselves perfectly balanced about said axis, thereby increasing the sensitivity of the device to the weight of the material being weighed.

A further object of the invention is to eliminate error due to variations in the rate at which the material is delivered to the balance means, by delivering such material thereto substantially in the vertical plane of the axis of support of the balance means, so as to minimize or eliminate the moment of force due to impact of the material on the balance means.

A further object of the invention is to provide an apparatus in which only very minute motion of the balance means is effected by variations in weight, so that the length of the lever arms involved remains practically constant, and in which such minute motion is caused to produce considerably greater motion of the recording or indicating means.

A particular object of the invention in its preferred form is to provide a weighing apparatus in which liquid pressure means are employed for effecting the measuring (recording or indicating) of the weight. A further object of the invention in connection with the use of such liquid pressure means, is to provide for automatic compensation for variations in temperature.

A further object of the invention is to provide means for automatically recording the time during which the apparatus is in operation.

A further object of the invention is to provide novel means for delivering the material onto the balance means, so as to prevent objectionable flowing of the material in the case of extremely fluent finely divided materials.

The apparatus in its preferred embodiment comprises essentially balance means supported so as to permit tilting about a horizontal axis, means for causing the material to be weighed to move over said balance means and exert a turning moment about the axis of support thereof, and means operable by tilting of said balance means to indicate or record the magnitude of such turning moment. The means for causing movement of the material over said balance means preferably comprises a conveyor mounted thereon, and constant speed driving means are also preferably mounted on said balance means and operatively connected to said conveyor. The entire balance means, including said conveyor and the driving means therefor, are preferably substantially balanced about the axis of support thereof, by being so arranged that their center of gravity lies substantially in the vertical plane of the axis of support, while said conveyor preferably passes across said vertical plane, and means are provided for delivering the material to be weighed onto said conveyor substantially at the position of said vertical plane. The means for indicating or recording the weight of material preferably comprise means for creating liquid pressure, dependent on the magnitude of the turning moment on the balance means, and for varying such liquid pressure in response to variations in the turning moment exerted upon the balance means, and indicating or recording means operable in response to such variations in liquid pressure. The apparatus also comprises certain other parts and advantageous features as hereinafter described.

The accompanying drawings illustrate embodiments of my invention and referring thereto:

Fig. 1 is a perspective view of a preferred embodiment thereof.

Fig. 2 is a vertical section on line 2—2 in Fig. 1.

Fig. 3 is a side elevation of a form of liquid pressure device for converting motion of the balance means into variations of liquid pressure, together with a device for compensating for variations in temperature of the liquid.

Fig. 4 is a plan view of the parts shown in Fig. 3.

Fig. 5 is a vertical section of the pressure device on line 5—5 in Fig. 4.

Fig. 6 is a vertical section of the temperature compensating device on line 6—6 in Fig. 4.

Fig. 7 is a front elevation of the recording device.

Fig. 8 is a detailed view showing part of a form of mechanism for recording the time intervals during which the device is in operation.

Fig. 9 is a vertical section of a modified form of apparatus showing the use of mechanical indicating or recording means instead of liquid pressure means.

Referring to Fig. 1 a concrete floor or other suitable supporting means is indicated at 1, upon which is mounted a fixed supporting frame 2 consisting, for example, of two side members 2a and an end member 2b. Movably mounted balance means are provided, comprising, for example, a frame 3, which may also consist of two side members 3a and an end member 3b, and conveying means 7 mounted thereon. Said frame is shown as pivotally supported on shaft 4 extending through bearing means 5 on the respective side members 2a of the fixed supporting frame. The center of said shaft constitutes the axis of support of the balance means. The conveying means may comprise a short endless conveyor belt 7 running over two pulleys or rollers 8 and 9, the pulley 8 being, for example, mounted in suitable bearing means on the side frame members 3a and the pulley 9 being mounted on bearing blocks 10 sliding in grooves 11 in said side frame members and provided with coiled springs 12 for pressing outwardly on said bearing blocks to maintain the belt tight at all times.

A constant speed electric motor 15 is mounted upon a supporting platform 16 connected to the side frame members 3a and is connected through suitable reducing gear means indicated at 17 to shaft 18, which is in turn connected through sprocket 19, chain 20 and sprocket 21, to the conveyor drive pulley 8. The reducing gear means is shown as comprising a worm 23 and worm wheel 24, which may be mounted in a suitable casing 25 on platform 26 connected to the side frame members 3a.

Means are provided for delivering the material to be weighed onto the conveying member 7 directly above the axis of support, that is, above shaft 4. Such means may comprise, for example, a chute 30 open at its lower end directly above such portion of the conveying member. Referring more particularly to Fig. 2, the lower end of said chute is cut away for a suitable height at the side of the chute from which the conveying member moves away, so as to permit the material to be carried out of the chute by the conveying member, while the other three sides of the chute extend down fairly close to the conveying member as shown. It is not practicable, however, to have the lower end of the walls of chute 30 engage tightly against the conveyor belt, as the resulting friction would cause objectionable wear on the belt, and also because such chute might exert a greater force upon the belt at one side of the axis of support than at the other side, or otherwise interfere with free rocking of the belt about its axis of support, and hence introduce an error in the recorded weight. I have found, however, that when handling certain types of finely divided materials, for example finely ground raw materials for Portland cement, and particularly where the fine grinding or other treatment of such materials has caused air to become intimately mixed therewith, the material acts very much like a liquid so long as it is in motion and therefore has a tendency, upon falling through the chute and striking the conveyor belt, to squeeze or flow out at the edges of the chute and over the surface of the conveyor belt and to run off the sides of such belt. This action is commonly called "flushing".

I therefore prefer to provide novel means as shown particularly in Fig. 2 for effecting delivery of the material from the chute onto the conveyor belt in such manner as to prevent this "flushing", or tendency to flow off the belt. Such means is shown as comprising an enclosing member 32 having side walls 33 and end wall 34 embracing the lowering end of chute 30 at its three closed sides and resting upon the conveyor belt. Said enclosing member is open at the side from which the conveyor belt moves away, so as not to interfere with the free movement of material in the direction of motion of the belt, while effectively preventing flowing of the material on the belt in any other direction. The lower edges of walls 33 and 34 are preferably rounded, as, for example, by being bent outwardly and upwardly as shown at 35, so as to prevent objectionable wear on the belt.

From the discharge end of the belt, that is, the end of the belt extending over the pulley 9, the material may be delivered to any suitable means; for example, such material may pass through opening 37 into chute 38 for conducting the same to any desired point. In case the material being handled consists of mixed and ground raw material for making Portland cement, the chute 38 may lead, for example, to the feed end of the rotary kiln used for burning such cement.

The liquid pressure operated measuring means is shown as including a liquid pressure device 40 adapted to resist motion of the balance means due to the weight of the material thereon and to create variable liquid pressure in response to such motion of the balance means and a measuring (recording or indicating) device 41 for measuring the resulting variations in liquid pressure. The liquid pressure device 40 is shown as comprising a cylindrical casing 43 supported by bracket 44 on the end member 2b of the fixed supporting means, and a metal bellows element 46 rigidly secured at its upper end to a normally fixed head member 47 and connected at its other end to an end plate 48. Said end plate is provided with a bearing member of relatively small surface such as a steel ball 49 adapted to be engaged by suitable means such as bar 51 secured to the end frame member 3b of the balance means. The bellows element 46 may be formed of any suitable flexible metal such as brass or copper, and is sufficiently thin walled to provide the desired flexibility.

Means are provided for holding the head member 47 of the bellows element in fixed position against any force due to any normal loading of the conveyor belt, while permitting such head member to yield in the event of application of a greater force due to the application of any extraordinary weight to said conveyor belt. For this purpose a coiled compression spring 53 may be provided between the member 47 and a relatively fixed head member 54. A threaded stem 55, formed integrally with or secured to the head member 47 is freely movable through opening 56 in member 54, and lock nuts or collars 57 are threaded on said stem and adapted to engage member 54. By tightening up on the adjusting collars 57, any desired compression may be applied to spring 53, such compression being so adjusted that an upward force greater than that caused by any normal weight on the conveyor belt is required to effect any further compression of said spring. The end member 48 at the bottom of the bellows element is permitted to move throughout a range corresponding to all normal loading of the conveyor belt, but suitable positive stop means are preferably provided for limiting the upward movement of said member upon application of excessive weight to the conveyor. For this purpose the member 48 may be provided at its periphery with a tapered or inclined face 58 adapted to engage a similarly tapered or inclined seat 59 at the lower end of cylinder 43. The amount of movement of member 48 which is permitted before engagement with said stop means may be adjusted by screwing the member 54 downwardly into the cylinder 43 in which it is threadedly mounted.

The measuring device 41 may be any suitable or well known type of recording or indicating liquid pressure gauge and is shown in Figs. 1 and 7 as being of the recording type. Said gauge is provided with an arm 61 pivoted at 62 and provided at its outer end with a pen stylus, or other recording element 63 operatively connected to any suitable form of pressure responsive means and adapted to inscribe a curve or record upon a chart 66 rotated by suitable clockwork mechanism in the usual manner of such gauges. The pressure responsive element of said gauge may be connected by tubing 64 to a passage 65 leading through stem 55 to the interior of the bellows element 46. The tubing 64 is formed of material sufficiently strong and rigid to withstand any liquid pressure developed by the pressure element without deformation of the walls of such tubing.

In order to compensate for variations in volume of the liquid in the system due to changes in temperature and thus prevent such temperature changes from affecting the pressure, suitable compensating means are provided for automatically varying the volume of the liquid containing system in proportion to the variation in the volume of the liquid. Such means may comprise, as shown particularly in Figs. 3, 4 and 6, a small bellows element 68 similar to the bellows element 46, secured between end members 69 and 70. The member 69 may be provided with a stem 71 connected to the tubing 64, a passage 72 leading through said stem to establish communication between said tubing and the interior of the bellows element 68. The end member 70 may be provided with a boss 74 to which are secured two parallel bars 75 of a metal having a relatively low coefficient of expansion. Said bars may, for example, be formed of invar metal which has substantially zero coefficient of expansion within the ordinary range of temperatures.

Two other bars 77 formed of some metal, such as aluminum, having a higher coefficient of expansion than the bars 75, are secured at one end to a fixed plate 78 adjacent the bellows element 68, said plate 78 being mounted in any suitable manner upon bracket 44. At a suitable distance from the plate 78 the bars 77 are connected by clamping means 79 to the bars 75, and in order to permit adjustment of said clamping means the same may be split or slotted as indicated at 81 and provided with suitable tightening bolts 82 so as to clamp tightly around the respective bars 75 and 77 when said bolts are tightened but to permit the clamping means to be moved inwardly and outwardly upon the bars when said bolts are loosened. The effective length of bars 77 may thus be adjusted so as to produce any desired rate of change of volume of the bellows element 68 with changes in temperature.

The length of the bellows element 68 and consequently its volume at any given temperature is also preferably adjustable. For this purpose the stem 71 may be threaded and a screw collar 84 may be provided thereon, said collar bearing against and projecting through the plate 78. A second screw collar 86 is threadedly mounted on the projecting portion of collar 84 at the other side of plate 78. The collar 84 may be screwed in or out on stem 71 to any desired position and the collar 86 then tightened to clamp plate 78 between the two collars. The position of the outer end of the bellows element 68 being fixed by clamping means 79, this adjustment of collars 84 and 86 determines the position of the inner end of the bellows element and consequently the cubical contents thereof. A lock nut 87 may also be threadedly mounted on stem 72 to hold the collar 84 in adjusted position thereon.

Tubing 64, bellows element 46 and 68, and the pressure element of the recording device 41 are all completely filled with water or any other suitable liquid. Branch tubes 98 and 99 may be provided, one for connection to a vacuum pump for exhausting the air from the system, and the other for connection to means for supplying water or other liquid thereto, said branch tubes being thereafter sealed off in any suitable manner.

In order to provide a record of the time intervals during which the device is in operation, the following mechanism is provided, referring particularly to Figs. 1 and 8. The shaft 18 above mentioned may operate through worm 89 and worm wheel 91 in casing 92 to rotate an eccentric member 93. The strap 94 of said eccentric member may be connected by wire 95 extending through tubing 96, to the recording instrument 41, said wire extending through the casing of said instrument and being provided at its end with a recording member such as pen 97. Wire 95 and tubing 96 are sufficiently light and flexible to exert substantially no restraining force against free swinging movement of the balance means.

In the operation of the above described apparatus the material to be weighed, consisting of any powdered or crushed material, for example powdered raw materials for use in making Portland cement, is delivered through chute 30 onto the conveyor belt 7 directly above the axis of support thereof, and hence in the vertical plane of such axis. Flowing of the material on the conveyor belt is prevented by the enclosing member 32 and such material is, therefore, caused to assume a position of rest with respect to the belt and is carried along by the belt and delivered through opening 37 and chute 38 to any suitable point, for example to the feed means of a rotary kiln in the case of Portland cement raw material. It is evident that by delivering the material onto the conveyor belt directly above the axis of support thereof, any downward force on the belt due to inertia of the material delivered thereto exerts practically no turning moment upon the balance means and, therefore, does not affect the weight measurements.

The weight of the material carried by the conveyor belt, however, exerts movement upon the balance member which tends to raise the other end of said balance member and cause the bar 51 thereon to engage and raise the end member 48 of the pressure element and compress the bellows means 46. The liquid pressure in the system is thus increased, such pressure being communicated through tubing 64 to the pressure recording means 41 and causing corresponding movement of arm 61, so that the recording member 63 inscribes a record of the pressure thus developed, as indicated by line A in Fig. 7, on the continuously rotating chart 66, in the well-known manner of such devices.

Since the conveyor belt is driven at a constant rate of speed by constant speed motor 15, the weight of material on the belt at any time is a function of the rate at which material is delivered onto the belt, so that the resulting measurements recorded by member 63 will furnish a record of the rate of feeding material. The chart of the recording gauge may be calibrated to indicate this rate of feed directly, or may read in any other suitable units from which the same may be calculated.

The bellows element 46 may be of such dimensions in proportion to the total volume of the liquid system, that only slight movement of the end member 48 is required to produce considerable changes in liquid pressure, sufficient to move the arm 61 through its entire range of movement. In case of variations in temperature, due, for example, to changes in the atmospheric temperature surrounding said apparatus, the bars 77 of the temperature compensating device will undergo a greater increase in length than the bars 75, thus causing an elongation and increase in volume of bellows element 68, so that the change in temperature of the liquid in the pressure system may be substantially entirely taken up in change of volume thereof and the pressure will remain substantially unaffected.

During the time the apparatus is in operation and material is being fed over the conveyor belt 7, the eccentric device 93 will operate through wire 95 to give the pen or recording member 97 a reciprocating motion so that a wavy line will be drawn upon the chart 66 as indicated at B in Fig. 7. On the other hand, when the device is not in operation said recording member will remain stationary and produce a smooth curve or circular line on said chart, as indicated at C. An indication or record is thus afforded as to the time intervals during which the device is in operation, and the apparatus may therefore be used to measure not only the rate of feeding the material at any particular time, but also the total weight of material passing over the device during any given period, as, for example, during a twenty-four hour period.

A modified form of apparatus embodying certain features of this invention is shown in Fig. 8. This apparatus comprises as before a fixed supporting frame 2', a frame 3', mounted to tilt about shaft 5' supported on frame 2' and a conveyor belt 7' running over pulleys 8' and 9' rotatably mounted on the frame 3'. The pulley 8' is driven by means of constant speed motor operating through reducing gear means 17', and means 30' and 38' are provided as before for respectively delivering material onto the conveyor belt in the vertical plane of the axis of support and conveying away material from the discharge end of the conveyor belt. The frame 3', conveyor 7', and the driving means therefor, are preferably so arranged that the center of gravity of the entire balance means lies somewhat to the left of the vertical plane of the axis of support.

One distinction between this apparatus and the form above described is that in this case the operation of the indicating or recording means is effected by movement of the balance means at the same side of the axis of support as that over which the material passes, whereas in the first form of apparatus the material passes over the balance means at one side of the axis of support and the indicating or recording operation is effected by motion of said balance means at the other side of said axis. It is seen, therefore, that the arrangement of the parts in so far as this relationship is concerned is immaterial to the present invention.

I have also shown in this case the use of mechanically operated indicating or recording means instead of liquid pressure means. Such means may comprise a flexible strap 102 connected to the end of frame 3' and passing over an eccentric face 103 on a small drum 104 on shaft 105. An arm 106 projects from said drum and is provided at its outer end with a weight 107 which is preferably adjustably mounted thereon. An indicating pointer or needle 108 also projects from drum 104 and moves over a graduated arc or scale 109. It is, obvious, however, that recording means may, if desired, be substituted for the indicating member 108.

The weight 107 is so adjusted that without any material on the conveyor belt 7' the turning moment exerted by said weight, acting through strap 108, just balances the turning moment of the balance means about its axis of support, due to its own weight, and the pointer 108 gives an indication of zero weight on scale 109.

I claim:

1. An apparatus for the continuous weighing of materials comprising balance means mounted to tilt about a horizontal axis of support, means for delivering material to be weighed onto said balance means substantially in the vertical plane of said axis of support, means on said balance means for causing said material to move at a definite speed over a certain portion of said balance means and to exert a turning moment thereon about said axis, a member operatively connected to said balance means and movable in response to variations in the magnitude of said turning moment, and scale means associated with said movable member.

2. An apparatus as set forth in claim 1, the center of gravity of said balance means, including said material moving means, lying substantially in said vertical plane of the axis of support.

3. An apparatus for the continuous weighing of materials comprising balance means mounted to tilt about a horizontal axis of support, conveying means mounted on said balance means and moving across the vertical plane of said axis of support, driving means operatively connected to said conveying means and also mounted on said balance means, means for delivering material onto said conveying means substantially in the vertical plane of said axis of support, a member operatively connected to said means and movable in response to variations in the magnitude of said turning moment, and scale means associated with said movable member.

4. An apparatus as set forth in claim 3, the center of gravity of said balance means and all parts mounted thereon, including said conveying means and driving means, lying substantially in the vertical plane of said axis of support.

5. An apparatus for the continuous weighing of materials comprising balance means mounted to tilt about a horizontal axis of support, means for delivering material onto said balance means and for causing the same to travel thereover so as to exert a turning moment thereon, recording means operable by said balance means in response to variations in said turning moment, and additional means for recording the time intervals of operation of the means for causing the material to travel over the balance means.

6. An apparatus for the continuous weighing of materials comprising balance means mounted to tilt about an axis of support, conveying means mounted on said balance means and movable across and away from the vertical plane of said axis, driving means for said conveying means also mounted on said balance means, means for delivering material to be weighed onto said conveying means substantially in the vertical plane of said axis, recording means operable by tilting of said balance means due to the turning moment exerted by material on said conveying means, and means for recording the time intervals of operation of said conveying means.

7. In apparatus for continuous weighing of material, a liquid-confining system, means operable in response to the weight of the material to vary the pressure of liquid in said system, means for measuring such pressure, and means for varying the volume of said liquid-confining system upon change in temperature and in accordance with the coefficient of expansion of said liquid so as to prevent such change in temperature from affecting the pressure of the liquid.

8. In apparatus for continuous weighing of material, balance means, conveying means mounted on said balance means, a chute for delivering material onto said conveying means and extending close to said conveying means but provided with an opening at the side from which the conveying means moves away, and means for preventing flushing of fluent material so delivered to said conveying means, said flush preventing means comprising enclosing means resting on said conveying means and fitting slidably around the lower end of said chute and being formed with an opening to permit material to be carried by the conveying means away from the chute.

9. In apparatus for the continuous weighing of materials comprising a frame, material moving means mounted on said frame, means pivotally supporting said frame about an axis of support intermediate the ends of said material moving means, means for delivering material onto said material moving means substantially in the vertical plane of said axis of support so as to cause such material to be moved by said material moving means over a portion thereof lying at one side of said axis of support, means resiliently resisting pivotal movement of said frame about said axis of support, and means for measuring pivotal movement of said frame due to the weight of material moved thereover.

10. An apparatus for the continuous weighing of materials comprising a frame, endless conveyor means mounted on said frame, means pivotally supporting said frame about an axis of support intermediate the ends of the upper run of said conveyor means, means delivering material onto the upper run of said conveyor means directly over said axis of support so as to cause such material to be moved by said conveyor means over the portion thereof lying at one side of said axis of support, means resiliently resisting pivotal movement of said frame about said axis of support, and means for measuring pivotal movement of said frame due to the weight of material on said conveyor means.

11. An apparatus for the continuous weighing of materials comprising balance means mounted to tilt about a horizontal axis of support, means for delivering material to be weighed onto said balance means and for causing the same to travel thereover and exert a turning moment about said axis, means confining a body of liquid, means operable by said balance means to vary the pressure of said liquid in accordance with variations in said turning moment, means for measuring the resulting variations in liquid pressure, and temperature compensating means connected to said liquid confining means and operable to permit variation of volume of the liquid therein, without substantial change in pressure thereof, upon variation in temperature.

12. An apparatus for the continuous weighing of materials comprising balance means mounted to tilt about a horizontal axis of support, means for delivering material to be weighed onto said balance means and for causing the same to travel thereover and exert a turning moment about said axis, a liquid pressure device operable by said balance means to create liquid pressure of a magnitude dependent upon the magnitude of said turning moment, a recording pressure gauge provided with a chart and with means for recording thereon variations in pressure against time, means connecting said gauge to said liquid pressure device, and means for also recording on the chart of said pressure gauge the time intervals of operation of the means for causing the material to travel over the balance means.

13. An apparatus for the continuous weighing of materials comprising balance means mounted to tilt about a horizontal axis of support, means for delivering material to be weighed onto said balance means and for causing the same to travel thereover and exert a turning moment about said axis, a liquid pressure device operable by said balance means to create liquid pressure of a magnitude dependent on the magnitude of said turning moment, a liquid pressure gauge, means connecting said gauge to said liquid pressure device, and temperature compensating means connected to the liquid containing system of the liquid pressure device, the liquid pressure gauge and the connecting means therefor, and operable by variation in temperature to vary the volume of said liquid containing system and prevent substantial variation in pressure due to such temperature variation.

14. An apparatus for the continuous weighing of material comprising balance means mounted to tilt about a horizontal axis of support, means for causing material to be weighed to pass continually over a portion of said balance means lying principally at least at one side of said axis of support, so as to exert a turning moment thereon about said axis, measuring means comprising a liquid confining system and means operable to vary the pressure in said liquid confining system in response to variations in said turning moment, and means for measuring the pressure in said liquid confining system, and means connected to said liquid confining system for varying the volume of the confined liquid in accordance with changes in temperature and in such manner as to prevent such changes in temperature from substantially effecting the pressure of said liquid.

15. In an apparatus for the continuous weighing of materials, balance means mounted to tilt about a horizontal axis of support, means for delivering material to be weighed onto said balance means substantially in the vertical plane of said axis of support, and means on said balance means for causing said material to move at a definite speed over a certain portion of said balance means and to exert a turning moment thereon about said axis.

16. An apparatus as set forth in claim 15, the center of gravity of said balance means, including said material moving means, lying substantially in said vertical plane of the axis of support.

17. In an apparatus for the continuous weighing of materials, balance means mounted to tilt about a horizontal axis of support, conveying means mounted on said balance means and moving across the vertical plane of said axis of support, driving means operatively connected to said conveying means and also mounted on said balance means, and means for delivering material onto said conveying means substantially in the vertical plane of said axis of support.

18. An apparatus as set forth in claim 17, the center of gravity of said balance means and all parts mounted thereon, including said conveying means and driving means, lying substantially in the vertical plane of said axis of support.

19. In an apparatus for the continuous weighing of materials, a frame, material moving means mounted on said frame, means pivotally supporting said frame about an axis of support intermediate the ends of said material moving means, and means for delivering material onto said material moving means substantially in the vertical plane of said axis of support so as to cause such material to be moved by said material moving means over a portion thereof lying at one side of said axis of support.

20. In an apparatus for the continuous weighing of materials, a frame, endless conveyor means mounted on said frame, means pivotally supporting said frame about an axis of support intermediate the ends of the upper run of said conveyor means, means delivering material onto the upper run of said conveyor means directly over said axis of support so as to cause such material to be moved over the portion of the upper run of the conveyor means lying at one side of said axis of support, and driving means operatively connected to said conveyor means and also mounted on said frame.

In testimony whereof I have hereunto subscribed my name this 31st day of May, 1928.

ROBERT T. KNAPP.